US010739737B2

(12) United States Patent
Veeramani et al.

(10) Patent No.: US 10,739,737 B2
(45) Date of Patent: Aug. 11, 2020

(54) ENVIRONMENT CUSTOMIZATION

(71) Applicant: INTEL CORPORATION, Santa Clara, CA (US)

(72) Inventors: Karthik Veeramani, Hillsboro, OR (US); Ujwal Paidipathi, Beaverton, OR (US); Ajit Joshi, Portland, OR (US)

(73) Assignee: Intel Corporation, Santa Clara, CA (US)

(*) Notice: Subject to any disclaimer, the term of this patent is extended or adjusted under 35 U.S.C. 154(b) by 889 days.

(21) Appl. No.: 14/865,588

(22) Filed: Sep. 25, 2015

(65) Prior Publication Data

US 2017/0090437 A1   Mar. 30, 2017

(51) Int. Cl.
*H04L 12/28*   (2006.01)
*G05B 15/02*   (2006.01)
*H04W 4/80*    (2018.01)

(52) U.S. Cl.
CPC .......... *G05B 15/02* (2013.01); *H04L 12/2816* (2013.01); *H04W 4/80* (2018.02); *H04L 2012/2841* (2013.01)

(58) Field of Classification Search
None
See application file for complete search history.

(56) References Cited

U.S. PATENT DOCUMENTS

| 7,480,619 B1* | 1/2009 | Scott ........................ 704/275 |
| 2011/0123168 A1 | 5/2011 | Cho et al. |
| 2014/0047487 A1 | 2/2014 | Guedalia et al. |
| 2014/0178034 A1 | 6/2014 | Kim |
| 2014/0321680 A1* | 10/2014 | Takahashi ............... H04S 7/304 381/303 |
| 2015/0277568 A1 | 10/2015 | Veeramani et al. |
| 2016/0139575 A1* | 5/2016 | Funes ................. H04L 12/2834 700/275 |

FOREIGN PATENT DOCUMENTS

| CN | 101311895 A | 11/2008 |
| CN | 102193548 A | 9/2011 |
| JP | 2006172184 A | 6/2006 |
| KR | 20100012013 A | 2/2010 |
| KR | 20140081636 A | 7/2014 |
| KR | 20150041109 A | 4/2015 |

* cited by examiner

*Primary Examiner* — Craig C Dorais
(74) *Attorney, Agent, or Firm* — International IP Law Group, P.L.L.C.

(57) ABSTRACT

A computing device and method to adjust operation of a smart device to customize an environment surrounding the computing device. The adjustment is made via an Application Program Interface (API) having a language known to the smart device, and via a transport abstraction module to internally route data in a transfer stack and facilitate delivery of the data to the smart device.

33 Claims, 6 Drawing Sheets

ENVIRONMENT CUSTOMIZATION

TECHNICAL FIELD

The present techniques relate generally to executing an application on a computing device, and more particularly, to customizing an environment of the computing device with respect to the application.

BACKGROUND ART

In the home, people employ a computing device to watch movies, play video games, and interact with media generally. The computing device may be a personal computer or desktop computer, laptop, television, DVD player, digital video recorder (DVR), gaming console, etc. A person may use a computing device having a video player to watch movies or other video content, and/or may use a computing device having a game application to play the game, and so on. The person may generally view the movie or game play on a display monitor or television, and listen with speakers associated with the computing device, display monitor, or television. In the competitive business of consumer electronics and services, there exists an ongoing need for continuous improvement in user-experience, reliability, affordability, and so forth.

BRIEF DESCRIPTION OF DRAWINGS

The same numbers are used throughout the disclosure and the figures to reference like components and features. Numbers in the 100 series refer to features originally found in FIG. 1; numbers in the 200 series refer to features originally found in FIG. 2; and so on.

DETAILED DESCRIPTION

Figure 1:
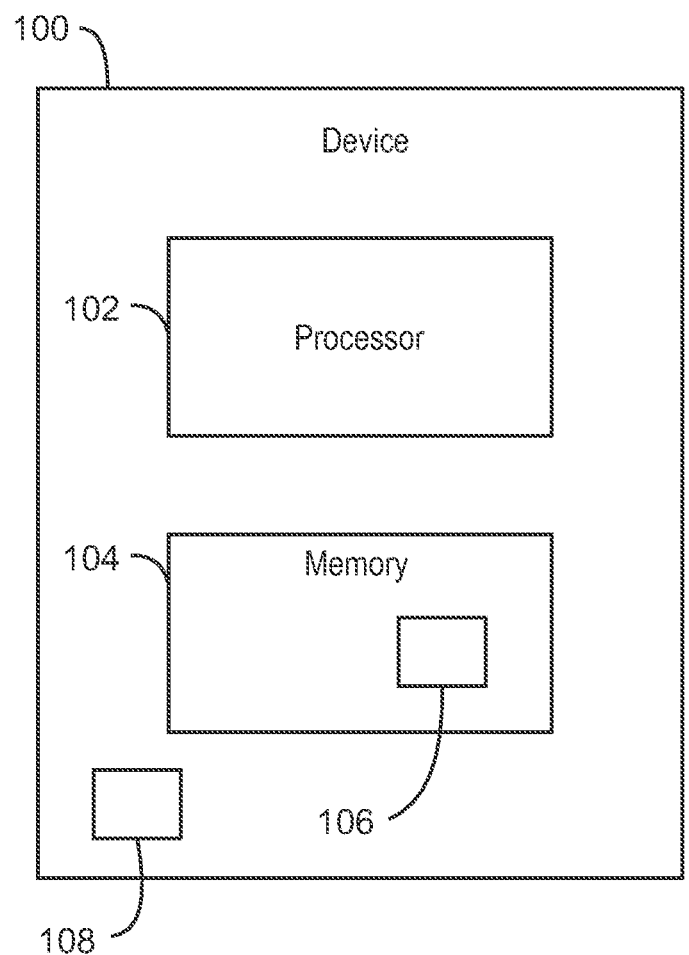
FIG. 1 is a diagram of a device for environment customization in accordance with embodiments of the present techniques.

The present techniques relate generally to customizing an environment of a computing device such as in a room. Embodiments relate to the computing device adjusting operation of a connected smart device to affect the environment with respect to a user and an application executing on the computing device. Examples are directed to an environment customization for video and game content through various mediums, networking, or communications, such as Internet of Things (IoT) and similar systems and protocols.

Some embodiments provide a mechanism to enhance video experience or gaming experience of the user by using the smart devices the user may have at home, for example. In certain examples, games (game applications) work with Application Program Interface (API) hooks to enumerate and control smart devices in a manner that may blend with the theme or action of the game or movie. One such example may be to make a connected smart watch vibrate when the game character controlled by the user is hit. With the advent of smart devices and Internet of Things, interesting and beneficial use cases can be developed including with the game developers and others making use of devices around the user to augment the experience.

In general, the IoT may be the network of physical objects or "things" embedded within electronics, software, sensors, and connectivity to facilitate objects to collect and exchange data. The Internet of Things may facilitate objects to be sensed and controlled remotely across existing network infrastructure, creating opportunities for more direct integration between the physical world and computer-based systems. Each "thing" may be uniquely identifiable through its embedded computing system and able to interoperate within the existing Internet infrastructure.

Embodiments herein relating to environment customization may include or accommodate connected devices, gaming, Internet of Things, mobile device, videos and movies, personal computers (PC), smart devices, laptops, and so on. Gaming and video are among common usages of computing devices, ranging from low-end mobile phones to high-end desktop PCs and consoles. Content creators and application developers may compete to create more realistic experiences, such as through perceptual computing, use of secondary displays, leveraging sensors built into devices, etc. Moreover, as discussed below such as with respect to auxiliary data, the consumers of the content could be contributors also. For example, a consumer of a movie could write an "effect file" that the consumer could make available public, such as to another consumer via download, for instance.

Examples herein may advance the experience, for instance, by customizing environment around the user while the user engages with content. Devices at home or business (and government, public places, universities, etc.), connected through Internet of Things, may be employed. Certain embodiments create or provide a standardized interface to applications to modify attributes of IoT devices (smart devices) such as smart light bulbs, a smart thermostat, smart watches, smart eye glasses, etc., to dynamically customize the environment based on the mood or other factors of the content being consumed. Examples are applicable to gaming, video, and other types of usages and applications.

A vast multitude of use cases may be applicable. In one example, a use case may be a user starts a video player application and grants the application permission to use the user's smart devices for customizing his (the user) environment. As the user starts watching a movie, the video player detects ambient light in the room using connected smart devices, such as a connected smart light sensor(s). The video player may then command smart devices such as one or more smart light switches or smart light bulbs in the room to dim down to an appropriate level, providing a movie theater-like experience.

Another example of a use case is a user starts a horror game on his device and gives the application permission to use his smart devices in the vicinity. He plays through the game and gets to a game section or scene of a cold, dimly lit room that becomes progressively brighter as he proceeds interacting with the game. During this section or scene, the game application, with the knowledge of what the user is doing in the game, commands the IoT-connected lights in the room, to dim down and brighten according to user's interaction with the game. The application may also reduce or increase room temperature by commanding the thermostat (an IoT or smart thermostat), to be aligned with the mood or estimated virtual temperature of the game section being played.

Customizing environment for video consumption and game play may be uniquely performed in a home environment using IoT. Such home performances and experiences may be relatively affordable in application in the home environment, including with existing smart devices in the home.

FIG. 1 is a device 100 such as a computing device for environment customization with applications (e.g., video, gaming, security, monitoring, etc.) and, networking communication such as IoT, and smart devices. The device 100 may be a personal computer (PC) or desktop computer, laptop, server, gaming console (with or without an associated television or display monitor), television, mobile device (e.g., tablet, smartphone, etc.), smart display monitor, smart device, and so forth. In the illustrated embodiment, the device 100 has a processor 102 such as a hardware processor, a microprocessor, a central processing unit (CPU), and the like. The processor 102 may be multiple processors and/or each processor 102 may have multiple cores. The device 100 has memory 104, such as non-volatile memory (hard drive, read-only-memory or ROM, flash memory, cards, etc.), volatile memory (e.g., random access memory or RAM, etc.), and other types of memory. Moreover, while FIG. 1 represents a single device 100, the processor(s) 102 and memory 104 having the stored executable applications and instructions 106 may instead or additionally be in a distributed computing system such as across multiple compute nodes.

In the illustrated example, the memory 104 stores application(s) and instructions 106 (e.g., code, logic, etc.) executable by the one or more processors 102. The applications may be, for example, a video player or game application. The instructions 106 may be executable by the processor 102 to implement environment customization (including in the home or business, etc.) and the techniques as discussed herein, such as with gaming and video configurations, and so on. The device 100 may be configured with a network adapter 108 to couple with and interact with smart devices, a remote network, a cloud network ("the cloud"), and the like. The network adapter 108 may be a wireless network adapter to wirelessly couple with and interact with smart devices to implement environment customization. The network adapter 108 may provide for wired (e.g., Ethernet, etc.) network connections with the smart devices, a wired network grid coupling smart devices, other computing devices, and so forth.

Again, the media applications such as game(s) or game application(s), a video player, and so on, may be stored in the memory 104, and/or provided externally. The device 100 may use wirelessly-connected smart devices (not shown) to enhance the media experience with environment customization. To so implement, the device 100 may store executable instructions 106 in the memory 104, such as an application framework, a transport module, and the like. The application framework when executed via the processor 102 may provide for communication with the connected smart devices. In some examples, the application framework may be an API layer that handles the operating system (OS) specific details. The application framework may present a programming interface to the media application (game, video player, etc.). Platform specific transport may include Bluetooth®, Wi-Fi, near field communication (NFC), Ethernet, and so forth, to communicate with the smart devices. The transport module may be an abstraction that includes transport techniques offered by the platform, and which include hardware for Bluetooth®, Wi-Fi, NFC, Ethernet, wired protocols, etc. and their associated drivers and API modules. The communication with an external smart device may depend on whether the smart device has a transport medium in common with what is offered by the transport platform(s) of the device 100.

As for the smart devices, a set of devices may have at least one transport medium in common with the device 100 or other computing devices. These smart devices may offer a set of 'capabilities' to facilitate control of the smart devices by systems such as the device 100. In some examples, a security mechanism generally allows only authorized devices to control the smart devices. For instance, someone standing outside the house within range may not use their mobile device to control a smart device present inside the house without authorization in certain examples. In one example, all authorized devices connect to a common Wi-Fi access point inside the user's house, which requires credentials to join. In order to protect user's privacy, an OS level check may be enforced when the device 100 or media application attempts to access each smart device. A way to implement such enforcement is by showing a permission dialog box when a media application tries to access a device for the first time, and saving user's preference in the OS. Another way may be to list the set of devices that the game or video player could control, during the installation of the game or video player, and allowing the user to choose which smart devices can be allowed.

Figure 2:
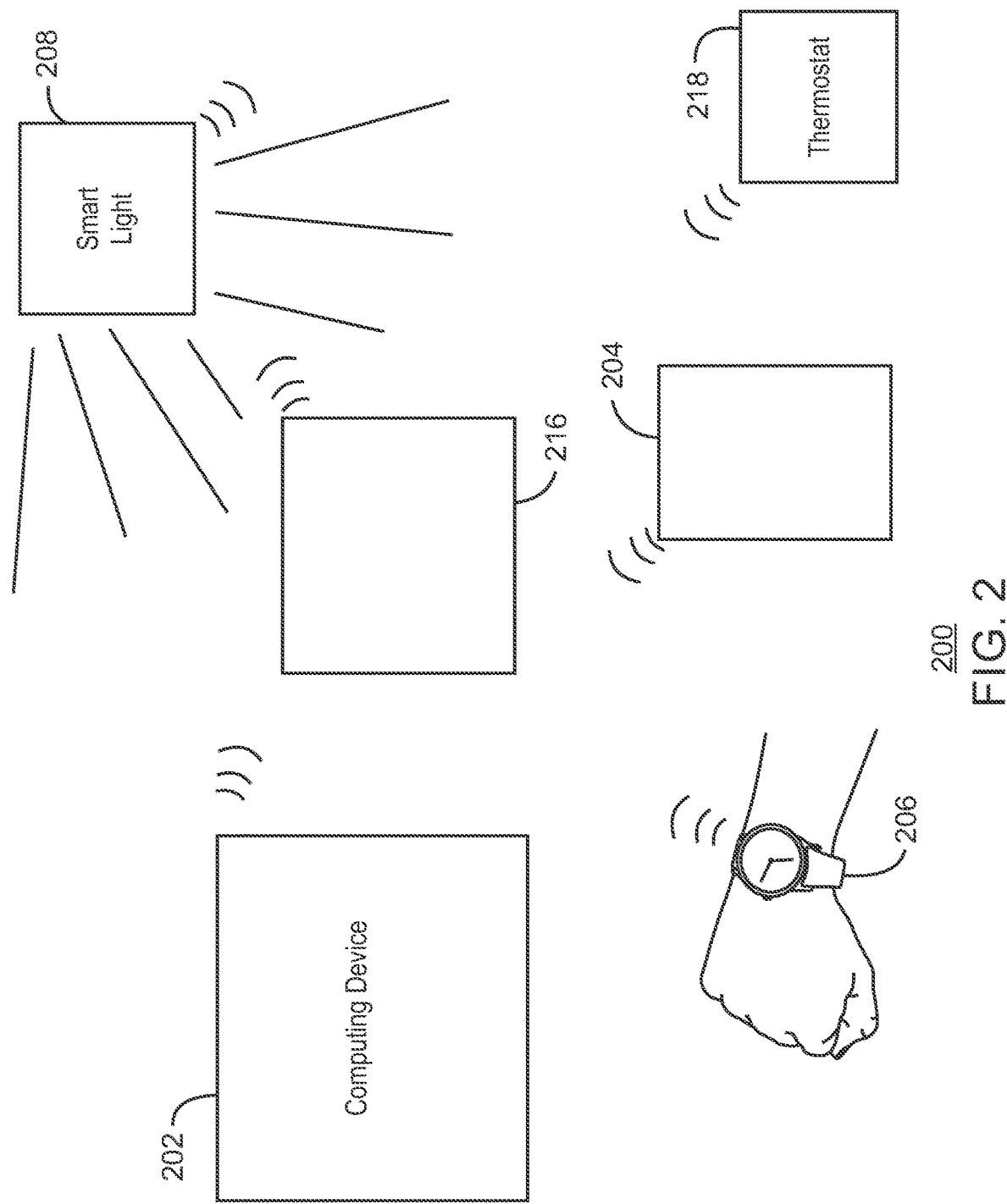
FIG. 2 is a block diagram of a system employing a computing device in accordance with embodiments of the present techniques.

FIG. 2 is an arrangement or system 200 employing a computing device 202 such as the device 100 (of FIG. 1) having a processor(s) 102 and memory 104 storing application(s) and instructions 106 executable by the processor to perform the techniques and applications described herein such as those related to gaming and video experiences, home environment customization, and the like. As indicated, the computing devices 100 and 202 may be a television (TV), a computer system (optionally having a display monitor), a laptop, an all-in-one computer, a gaming console (with or without an associated television or display monitor), a tablet, and so on. In the illustrated embodiment of FIG. 2, the arrangement or system 200 may accommodate game or media implementations, or other uses.

The computing device 202 may execute an application such as a media application, game (game application), video player, and so on. A mobile device 204 such as a smartphone, laptop, tablet, etc. may also be employed, including with respect to viewing of and interaction with the application and the computing device 202. Further, a wearable computing device such as a smart watch 206, computer glasses (not shown), and the like, may be utilized with respect to the application, and may be characterized as a smart device in certain instances. Furthermore, a smart device such as a smart light 208 is disposed in the environment (e.g., room) of the computing device 202. Also, in the illustrated example of FIG. 2, a second display monitor 216 is optionally available to view the application. Lastly, additional smart devices such as a smart thermostat 218 may be situated in the environment (e.g., on a wall of the room) and utilized. The various devices depicted may each have a network adapter or network capability to wirelessly couple amongst each other including to the computing device 202. Indeed, the computing device 202 may have a network adapter 108 as depicted in FIG. 1, for example.

In action, the computing device 202 may adjust operation of the smart devices (e.g., 206, 208, 218, etc.) in response to feedback from the application running on the computing device 202 and/or from auxiliary input fed (e.g., via an auxiliary data file) to the computing device 202. The feedback may be related to user interaction with the application, triggers in the application, auxiliary data for the application, and so forth. In response to such feedback or events, the computing device 202 may adjust, for example, the smart light 206 to adjust brightness in the environment such as in the room. To adjust the smart light (and therefore room brightness), the computing device may, for instance, send data to the smart light 206 to adjust a dimmer or variable switch, e.g., resistor switch, semiconductor switch, etc., of the smart light. In the case of a smart thermostat 218, the computing device 202 may instruct or send data to the thermostat 218 to change a set point, e.g., a temperature set point, of the thermostat 218 which may facilitate control of an air conditioning and heating system, for example. With respect to the smart watch 206, the computing device 202 may, for example, send a signal to the watch 206 such that the watch 206 vibrates or emits an audio sound (e.g., beeps), and so on.

Figure 3:
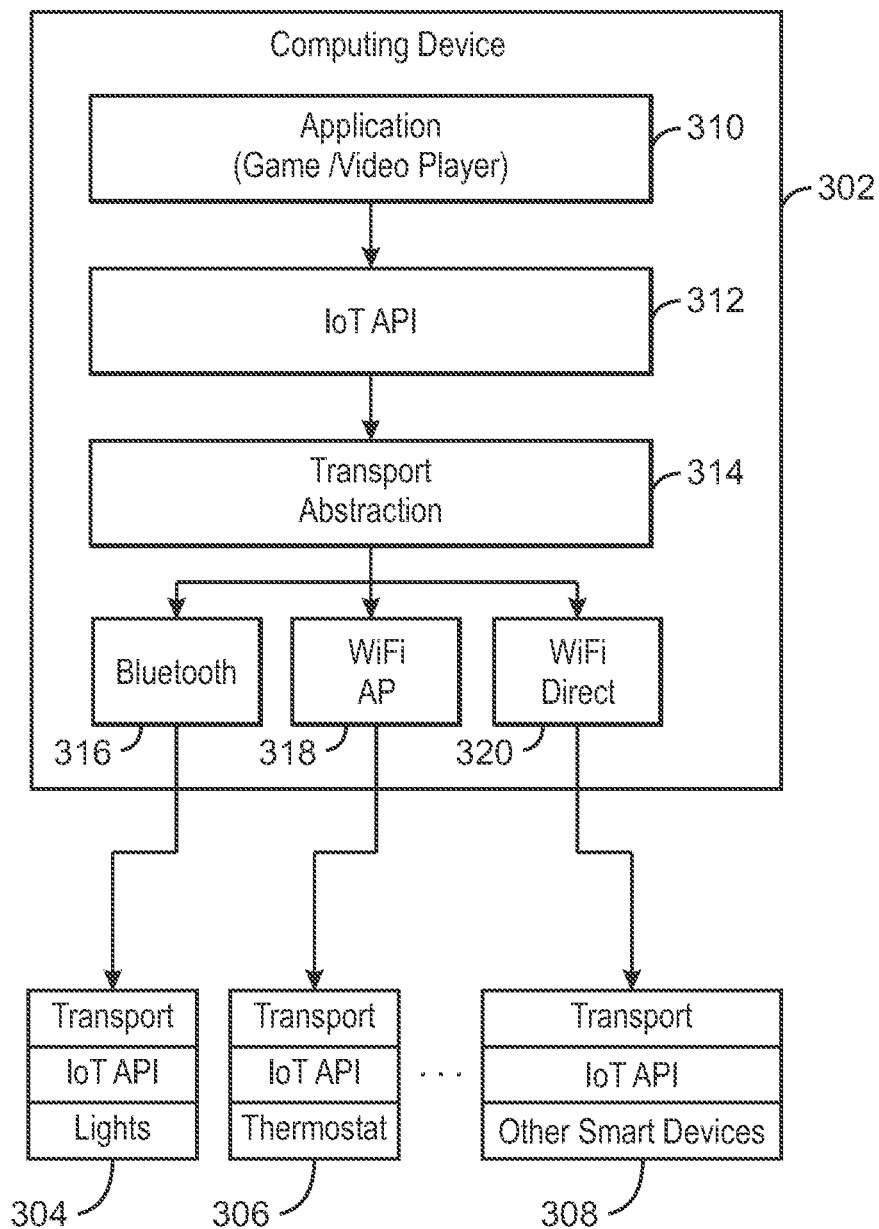
FIG. 3 is a block diagram of a system having a computing device in accordance with embodiments of the present techniques.

FIG. 3 is a system 300 having a computing device 302 which may be analogous to the computing device 202 (FIG. 2) and the device 100 (FIG. 1) having the processor 102 and memory 104 with application(s) and instructions 106 executable by the processor 102. In the illustrated embodiment of FIG. 3, the computing device 302 is configured, e.g., via hardware and stored executable instructions, to wirelessly couple with and interact with smart devices 304, 306, and 308 (e.g., IoT devices) in the environment surrounding the computing device 302, and with other smart devices. The smart devices IoT devices may be at the home (a "smart home") or other type of location or environment.

In this example, the computing device 302 has in memory an application 310 which may be represented at a high level in which a user interacts with the application. The application 310 could be, for example, a game application or video player that may use local content (game, media, etc.) stored on the computing device 302 or otherwise locally, or content from a remote network or cloud network ("the cloud"), and the like. The application 310 interacts with an IoT Application Program Interface (API). In the illustrated example, the application 310, e.g., game application, video player, etc., interacts with an IoT API module 312 which is executable instructions stored in memory, and which may have a language format known to smart IoT devices (e.g., 304, 306, 308) in the environment of the computing device 302. For instance, the IoT API 312 could use a language such as Google Weave® or similar programs or languages, which may facilitate communication between devices, locally and in the cloud. Below the IoT API 312 layer, may be a transport abstraction module 314 implementing or covering (or "hides") the underlying mechanism(s) used to carry or deliver data to IoT devices such as smart devices 304, 306, and 308. In certain embodiments, the transport abstraction module 314 internally routes data between various transport stacks available on the device 302, such as NFC, Bluetooth® 316, Wi-Fi access point (AP) 318 connection, and/or Wi-Fi Direct® 320, and the like. The term Wi-Fi may carry a trademark Wi-Fi®. Moreover, Wi-Fi Direct®, initially called Wi-Fi peer-to-peer (P2P), is a Wi-Fi standard facilitating devices to connect with each other without requiring a wireless access point, and may be usable for internet browsing, file transfer, to communicate with more than one device simultaneously at typical Wi-Fi speeds, and so forth. Furthermore, the transport stack(s) may also be directed to Ethernet and/or other wired protocols.

As for the smart devices, the smart devices 304, 306, and 308 may have a processor and memory storing instructions (code, logic) executable by the processor. In this example, the smart devices in the environment surrounding the computing device include a light, thermostat, and other smart devices. The smart device 304 is a smart light(s). The smart device 306 is a smart thermostat. The smart device 308 represents other or additional smart devices. The depicted smart devices 304, 306, and 308 each may have stacks consisting of device hardware, with the IoT API module as instructions stored in memory and executable by the respective processor of the smart device. The Iot API may run generally on top to control the hardware according to the commands the smart device IoT API receives. In certain embodiments, the transport module comprising executable instructions, e.g., operating above the IoT API, covers or "hides" the mechanism used to bring in the commands.

Figure 4:
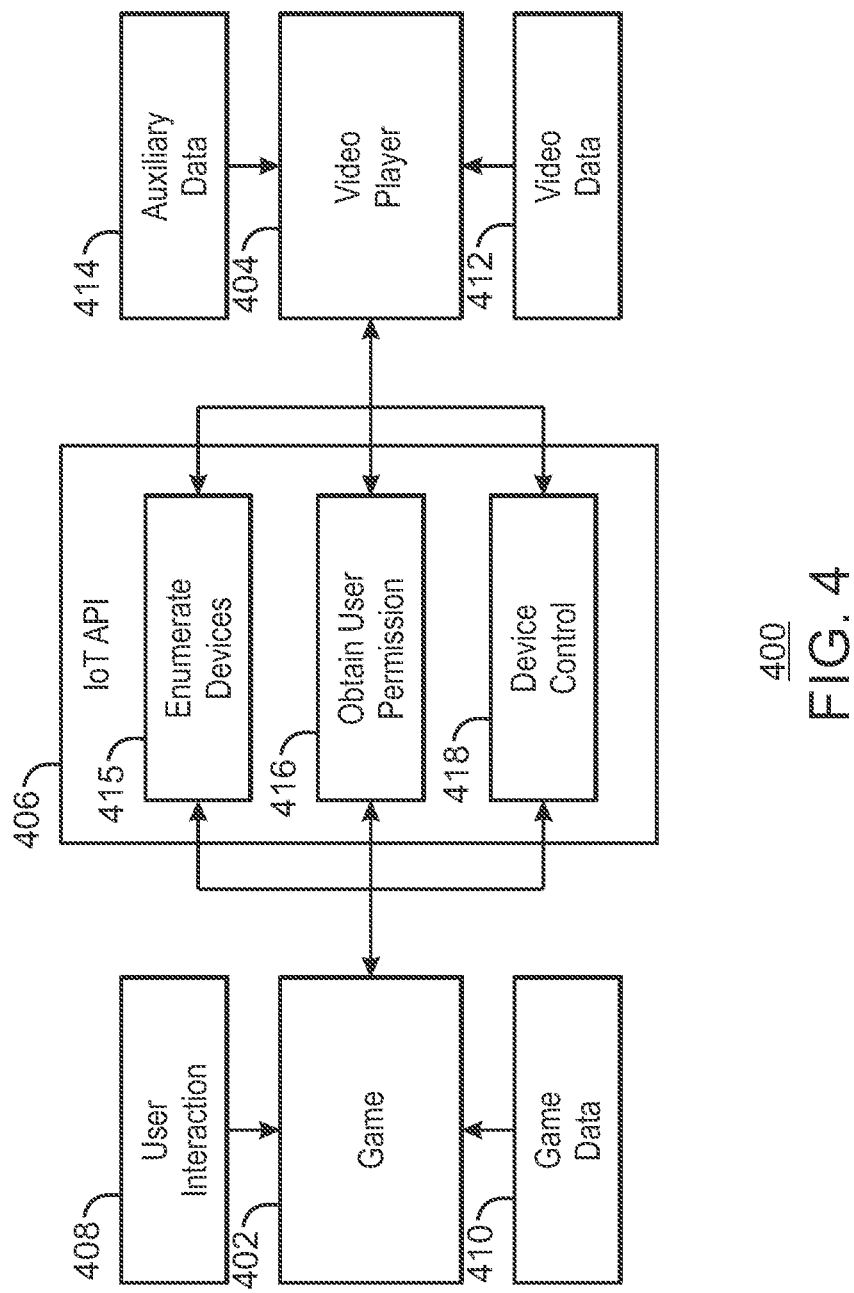
FIG. 4 is a diagram of a method highlighted by a device with software architecture for implementing environment customization in accordance with embodiments of the present techniques.

FIG. 4 is a method 400 highlighted by a device (e.g., 100, 202, 302) with software architecture, e.g., instructions or code stored in memory and executable by a processor, for implementing environment customization. The software architecture may include or accommodate game and video content, and can be expanded for other usages. In the illustrated example, the method 400 may utilize the device storing a game 402 (i.e., game application), a video player 404, and an IoT API 406. The method 400 and software architecture may rely on user action 408 and game data 410 as triggers with respect to the game 402 for modulating or changing smart device attributes in the environment. Similarly, the method 400 and software architecture may rely on video data 412 and auxiliary data 414 (discussed below) as triggers with respect to the video player 404 for modulating and/or changing operation/attributes of the smart devices (e.g., light, thermostat, etc.) in the home or immediate environment.

In some embodiments, components of the IoT API 406 include a device enumerator, permission checker, and device control. Thus, the method 400 via the Iot API 406 may enumerate (block 415) devices, obtain (block 416) user permission, provide (block 418) device control, and so on. The device enumerator may list (block 416) available smart devices, their types, and attributes that can be read or modified. The device control may accept (block 418) commands that are conveyed to the smart device(s) for reading and setting smart device attributes. The permission checker is in place to guard user's privacy, such as treating smart devices as resources that may request (block 416) user's consent to facilitate programmatic control.

As mentioned, if the application is a game 402, the user interaction 408 and/or the game data 410 (e.g., scene in the game being played) may be triggers for changing smart device attributes. For instance, the mood of the game scene or the user's character speed and performance in the game, etc., may determine which smart devices to adjust or modify, what attributes of the smart device to set and to what values. As indicated in an earlier example, a game that has cold and dimly lit sections may choose to modify thermostat and light bulbs in the actual room that houses the user, the device with the game, and the smart devices (thermostat, light bulbs, etc.). Similarly, in a shooter game, if a user via a game character shoots down all of the virtual lights in a game scene, the actual room the user is in physically could go dim or dark, by the computing device dimming or turning off lights in the actual room via the example method 400 and software architecture described herein.

As for video usage, the video player 404 may employ embodiments of the techniques in multiple ways. For instance, a common set of changes for any movie being played may be available and implemented. For instance, adjusting temperature, dimming the light (e.g., via a variable switch for the light bulb) based on ambient light, etc., could be applied to any movie to create a theatrical experience. In other words, in response to any movie starting on the video player, the device (e.g., 100, 202, or 302) could dim a smart light in the room, adjust a smart thermostat in the room, and so forth. As mentioned, other experiences may involve customizing the environment dynamically based on the video content or data 412 being played.

To facilitate dynamic customizing of the environment based on video data 412, an auxiliary input (auxiliary data 414) may be provided to the video player externally, in the form of a data file (e.g., auxiliary data file), for example. The data file could mention either the nature of the movie scene (action, horror etc.), or more specifically, the adjustments that can be applied to connected smart (IoT) devices, for various time points in the movie. In the case where the nature of the scene is specified, the video player 404 may choose to apply a matching profile, with a list of environment customizations. In the case where the actual customizations are mentioned in the auxiliary data 414, the player 404 may choose a subset based on availability of smart devices, user's consent, allowed range of values, etc. Note that, an auxiliary data 414 file could be created by anyone (user, third party, etc.), not just the author of the video data 412 content. A fan of a movie may spend the time to author the auxiliary data 414 file in a certain format, in a manner the fan deems suitable to watch the movie. In some examples, the video player 404 may offer an interface to download auxiliary data 412 as one or more customization profiles from the Internet for a certain movie, before the user starts watching the movie. In sum, the auxiliary data 414 file may be downloaded or created by the user, accompany the video (movie) or game, and the like. The auxiliary data 414 may be an effects file providing for music, light adjustments, temperature adjustment, and so on, in the room or environment via smart devices. Implementation of the room effects may be automated as the application executes and relies on the auxiliary data 414

In general, embodiments of the present techniques may provide a more realistic user experience for video and game consumption, through environment customization using, for example, Internet of Things. As discussed, the embodiments include architectures for how gaming and video applications can leverage this environment customization with a computing device wirelessly coupled to smart devices in the home (or other environment). The ecosystem may include capability between mobile devices/PCs with IoT devices. The IoT stack may build in functionality. The relevant executable instructions or code may be provided separate and/or bundle with mobile device, laptops, PCs, and the like.

Figure 5:
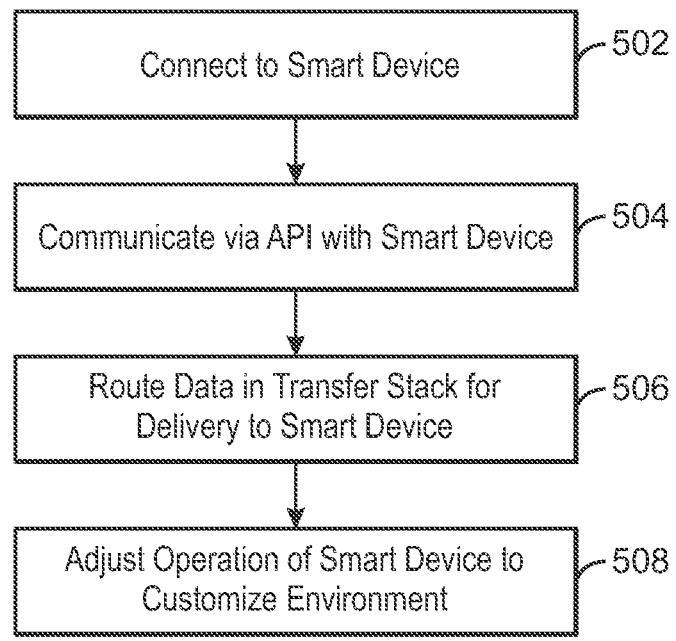
FIG. 5 is a block flow diagram of method of customizing an environment of a computing device in accordance with embodiments of the present techniques.

FIG. 5 is a method 500 of customizing an environment of a computing device executing a media application. At block 502, the method includes coupling to a smart device. The coupling may be via a wireless and/or wired connection. At block 504, the method includes communicating with the smart device via an Application Program Interface (API) having a language known to the smart device. At block 506, the method includes routing, by a transfer abstraction module, data internally in a transfer stack for delivery to the smart device. Further, at block 508, the method includes adjusting operation of the smart device correlative with the media application to customize the environment of the computing device. The adjusting operation may be to change settings or attribute values of the smart device.

Moreover, as discussed, the smart device may be an Internet of Things (IoT) device, and the API may include an IoT API. Multiple smart devices may be utilized and may include, for example, a smart light, a smart thermostat, and so on. The adjusting operation of the smart devices may include adjusting operation of the smart light to adjust room brightness, adjusting operation of the smart thermostat to adjust room temperature, and so forth. In examples with the media application as a game application, the adjusting of operation of the smart device may be correlative with user interaction with the game application, or correlative with game data such as a game scene, or a combination thereof, and the like. In examples with the media application being a video player, the adjusting of operation of the smart device may be in response to a user starting the video player to play a movie, or per an auxiliary data file, or a combination thereof, and so on. The computing device may receive the auxiliary data file if such a file is available, provided, or employed.

Figure 6:
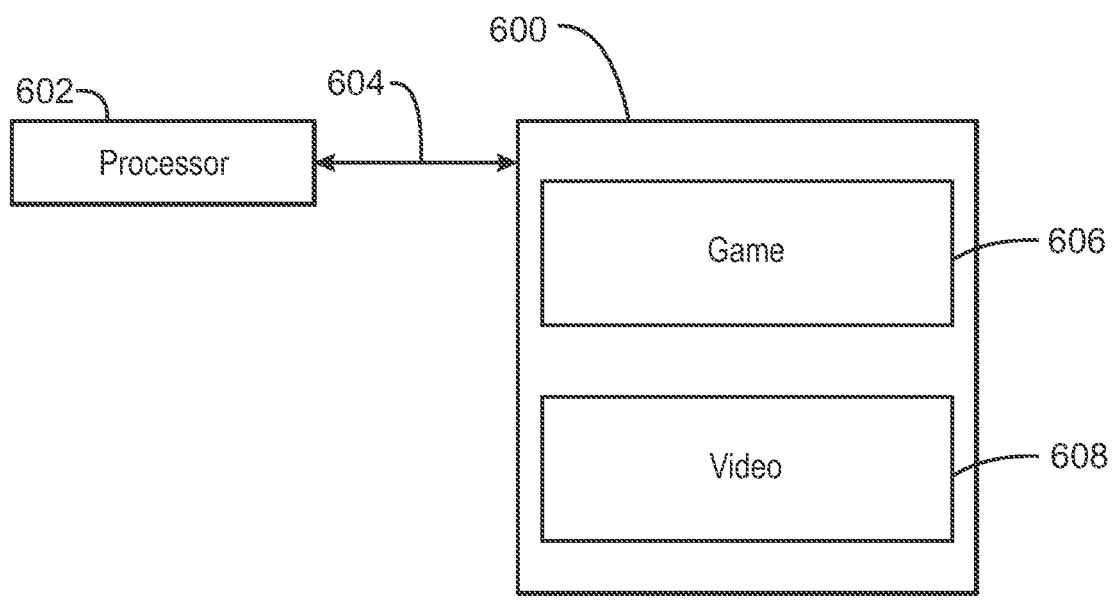
FIG. 6 is a block diagram depicting an example of a tangible non-transitory, computer-readable medium that can facilitate customization of an environment in the vicinity of a computing device in accordance with embodiments of the present techniques.

FIG. 6 is a block diagram depicting an example of a tangible non-transitory, computer-readable medium 600 that can facilitate customization of an environment in the vicinity of a computing device. The computer-readable medium 600 may be accessed by a processor 602 over a computer interconnect 604. The processor 602 may be a processor (e.g., 102) of the computing device. The tangible, non-transitory, computer-readable medium 600 may include executable instructions or code to direct the processor 602 to perform the operations of the techniques described herein.

The various software components discussed herein may be stored on the tangible, non-transitory, computer-readable medium 600, as indicated in FIG. 6. For example, with respect to a game application running on a computing device, a game environment module 606 (executable code/instructions) may direct the processor 602 rely on, for instance, user interaction with the game application, and game data (e.g., scene in the game being played) as triggers for or directing the adjustment in operation or changing of attributes of smart devices. Similarly, a video module 608 may provide for a common set of changes to smart device settings or operation for any movie being played. For example, dimming a smart light to create a theatrical experience. Other experiences may involve customizing the environment dynamically based on the video content or data being played, or per an auxiliary file.

The executable instruction or code of the computer-readable medium 600 that direct the processor 602 may include a transfer abstraction module and an API or IoT API including a device enumerator, permission checker, and device control. The instructions may direct the processor 602 to customize a physical environment local and external to the computing device, with the computing device running an application. The instructions may be executable by the processor 602 to: communicate via an API with a smart device wirelessly coupled to the computing device, the API having a language known to the smart device; route, via the transfer abstraction module, data internally in the computing device in a transfer stack for delivery to the smart device; and adjust operation of the smart device correlative with the application to customize the physical environment. It should be understood that any number of additional software components not shown in FIG. 6 may be included within the tangible, non-transitory, computer-readable medium 600, depending on the application or other considerations. Moreover, while two modules, a game environment module 606 and video module 608, are depicted, additional modules directed to other applications and types of usages may be stored on medium 600.

In summary, an embodiment may include a computing device having a processor and memory. The memory stores an application and instructions executable by the processor to adjust operation of a smart device, e.g., an IoT device. The smart device is disposed locally to the computing device and to adjust operation of the smart device is to customize an environment surrounding the computing device for user-experience. The instructions include an API, e.g., an IoT API, having a language known to the smart device, and a transport abstraction module when executed by the processor to internally route data in a transfer stack and facilitate delivery of the data to the smart device. The computing device may include a network adapter to couple, e.g., to communicatively couple via a network or protocol, the computing device with the smart device. The coupling could be wireless such as via a wireless access point, wireless direct, near field communication (NFC), Bluetooth®, and so on. The coupling could also be a wired connection. For example, a home could have a gaming console (computing device) and a thermostat (smart device) both having Ethernet ports, and which are wired connected to home router via a backbone network running behind the walls of a house. Moreover, the smart device may instead be multiple smart devices, such as a smart light and a smart thermostat, and wherein to adjust operation includes to adjust the smart light to adjust room brightness, and to adjust the smart thermostat to adjust room temperature.

The application may be a game application, and wherein to adjust operation of the smart device is based on user interaction with the game application, and/or based on game data such as a game scene. The application may be a video player, and wherein to adjust operation of the smart device is in response to a user starting the video player to play a video or movie. To adjust operation of the smart device may also be based on an auxiliary data file.

In general, the application is a media application, and wherein the API when executed by the processor facilitates communication of the computing device with devices locally and in a cloud network, the devices comprising the smart device. The transport abstraction module may hide some of the mechanism(s) facilitating delivery of the data from the computing device to the smart device. Lastly, the transfer stack may be directed to Bluetooth®, a Wi-Fi access point connection, Wi-Fi Direct®, NFC, and so on.

Some embodiments may be implemented in one or a combination of hardware, firmware, and software. Some embodiments may also be implemented as instructions stored on a machine-readable medium, which may be read and executed by a computing platform to perform the operations described herein. A machine-readable medium may include any mechanism for storing or transmitting information in a form readable by a machine, e.g., a computer. For example, a machine-readable medium may include read only memory (ROM); random access memory (RAM); magnetic disk storage media; optical storage media; flash memory devices; or electrical, optical, acoustical or other form of propagated signals, e.g., carrier waves, infrared signals, digital signals, or the interfaces that transmit and/or receive signals, among others.

An embodiment is an implementation or example. Reference in the specification to "an embodiment", "one embodiment", "some embodiments", "various embodiments," or "other embodiments" means that a particular feature, structure, or characteristic described in connection with the embodiments is included in at least some embodiments, but not necessarily all embodiments, of the present techniques. The various appearances of "an embodiment," "one embodiment," or "some embodiments" are not necessarily all referring to the same embodiments. Elements or aspects from an embodiment can be combined with elements or aspects of another embodiment.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

Examples are provided. Example 1 is a computing device. The computing device includes a processor, and memory storing an application and instructions executable by the processor to adjust operation of a smart device disposed locally to the computing device, to customize an environment surrounding the computing device for user-experience. The instructions include: an Application Program Interface (API) having a language known to the smart device; and a transport abstraction module when executed by the processor to internally route data in a transfer stack and facilitate delivery of the data to the smart device.

Example 2 includes the computing device of example 1, including or excluding optional features. In this example, the computing device includes a network adapter to couple the computing device with the smart device, and wherein the smart device comprises multiple smart devices.

Example 3 includes the computing device of any one of examples 1 to 2, including or excluding optional features. In this example, the smart device comprises an Internet of Things (IoT) device, and wherein the API comprises an IoT API.

Example 4 includes the computing device of any one of examples 1 to 3, including or excluding optional features. In this example, the smart device comprises multiple smart devices comprising a smart light and a smart thermostat, and wherein to adjust operation comprises to: adjust the smart light to adjust room brightness; and adjust the smart thermostat to adjust room temperature.

Example 5 includes the computing device of any one of examples 1 to 4, including or excluding optional features. In this example, the application comprises a game application, and wherein to adjust operation of the smart device is based on user interaction with the game application.

Example 6 includes the computing device of any one of examples 1 to 5, including or excluding optional features. In this example, the application comprises a game application, and wherein to adjust operation of the smart device is based on game data comprising a game scene.

Example 7 includes the computing device of any one of examples 1 to 6, including or excluding optional features. In this example, the application comprises a video player, and wherein to adjust operation of the smart device is in response to a user starting the video player to play a video.

Example 8 includes the computing device of any one of examples 1 to 7, including or excluding optional features. In this example, the application comprises a video player, and wherein to adjust operation of the smart device is based on an auxiliary data file.

Example 9 includes the computing device of any one of examples 1 to 8, including or excluding optional features. In this example, the application comprises a media application, and wherein the API when executed by the processor facilitates communication of the computing device with the smart devices locally and in a cloud network, the devices comprising the smart device.

Example 10 includes the computing device of any one of examples 1 to 9, including or excluding optional features. In this example, the transport abstraction module hides a mechanism facilitating delivery of the data from the computing device to the smart device.

Example 11 includes the computing device of any one of examples 1 to 10, including or excluding optional features. In this example, the transfer stack is directed to Bluetooth, a Wi-Fi access point connection, Wi-Fi Direct, Near Field Communication (NFC), or Ethernet wired connection, or any combination thereof.

Example 12 is non-transitory computer-readable medium comprising instructions executable by a processor of a computing device to direct the processor to customize via a smart device a physical environment local and external to the computing device, the computing device running an application, the instructions executable by the processor to: communicate via an Application Program Interface (API) with the smart device, the smart device coupled to the computing device, and the API having a language known to the smart device; route, via a transfer abstraction module, data internally in the computing device in a transfer stack for delivery to the smart device; and adjust operation of the smart device correlative with the application to customize the physical environment.

Example 13 includes the non-transitory computer-readable medium of example 12, including or excluding optional features. In this example, the smart device comprises an Internet of Things (IoT) device, and wherein the API comprises an IoT API.

Example 14 includes the non-transitory computer-readable medium of any one of examples 12 to 13, including or excluding optional features. In this example, the smart device comprises multiple smart devices comprising a smart light and a smart thermostat, and wherein to adjust operation comprises to: adjust the smart light to adjust room brightness; and adjust the smart thermostat to adjust room temperature.

Example 15 includes the non-transitory computer-readable medium of any one of examples 12 to 14, including or excluding optional features. In this example, the application comprises a game application, and wherein to adjust operation of the smart device is based on game data, or user interaction with the game application, or a combination thereof.

Example 16 includes the non-transitory computer-readable medium of any one of examples 12 to 15, including or excluding optional features. In this example, the application comprises a video player, and wherein to adjust operation of the smart device is in response to a user starting the video player to play a video, or is based on an auxiliary data file, or a combination thereof.

Example 17 is a method of customizing an environment of a computing device, the method. The method includes instructions that direct the processor to executing a media application; coupling to a smart device; communicating with the smart device via an Application Program Interface (API) having a language known to the smart device; routing, by a transfer abstraction module, data internally in a transfer stack for delivery to the smart device; and adjusting operation of the smart device correlative with the media application to customize the environment of the computing device.

Example 18 includes the method of example 17, including or excluding optional features. In this example, the smart device comprises an Internet of Things (IoT) device, and wherein the API comprises an IoT API.

Example 19 includes the method of any one of examples 17 to 18, including or excluding optional features. In this example, the smart device comprises multiple smart devices comprising a smart light and a smart thermostat, and wherein adjusting operation comprises: adjusting operation of the smart light to adjust room brightness; and adjusting operation of the smart thermostat to adjust room temperature.

Example 20 includes the method of any one of examples 17 to 19, including or excluding optional features. In this example, the media application comprises a game application, and wherein adjusting operation of the smart device is correlative with user interaction with the game application.

Example 21 includes the method of any one of examples 17 to 20, including or excluding optional features. In this example, the media application comprises a game application, and wherein adjusting operation of the smart device is correlative with game data comprising a game scene.

Example 22 includes the method of any one of examples 17 to 21, including or excluding optional features. In this example, the media application comprises a video player, and wherein adjusting operation of the smart device is in response to a user starting the video player to play a movie.

Example 23 includes the method of any one of examples 17 to 22, including or excluding optional features. In this example, the method includes the computing device receiving an auxiliary data file, wherein the media application comprises a video player, and wherein adjusting operation of the smart device is per the auxiliary data file.

Example 24 is a system for customizing an environment, the system. The system includes instructions that direct the processor to a smart device; a computing device comprising: a processor; and memory storing an application and instructions executable by the processor to: route, by a transfer abstraction module, data internally in a transfer stack for delivery to the smart device; deliver the data to the smart device via an Application Program Interface (API) of the computing device and via the wireless connection, wherein the API comprises a language known to the smart device; and adjust operation of the smart device via the data delivered to the smart device to customize an environment surrounding the computing device for user-experience.

Example 25 includes the system of example 24, including or excluding optional features. In this example, the computing device to execute a media application; the computing device to establish a connection with the smart device; the smart device comprises an Internet of Things (IoT) device; the API comprises an IoT API; and the media application comprises a game or video player, wherein to adjust operation of the smart device is correlative with user interaction with the media application.

Example 26 is a system for customizing an environment of a computing device, the computing device to execute a media application. The system includes means for coupling the computing device to a smart device, the computing device to execute a media application; means for the computing device communicating with the smart device; means for the computing device routing data internally for delivery to the smart device; and means for adjusting operation of the smart device correlative with the media application to customize the environment of the computing device.

Example 27 includes the system of example 26, including or excluding optional features. In this example, the smart device comprises an Internet of Things (IoT) device.

Example 28 includes the system of any one of examples 26 to 27, including or excluding optional features. In this example, the smart device comprises multiple smart devices comprising a smart light and a smart thermostat, and wherein the means for adjusting operation comprises: means for adjusting operation of the smart light to adjust room brightness; and means for adjusting operation of the smart thermostat to adjust room temperature.

Example 29 includes the system of any one of examples 26 to 28, including or excluding optional features. In this example, the media application comprises a game application, and wherein the means for adjusting operation adjusts operation of the smart device correlative with user interaction with the game application.

Example 30 includes the system of any one of examples 26 to 29, including or excluding optional features. In this example, the media application comprises a game application, and wherein the means for adjusting operation adjusts operation of the smart device correlative with game data comprising a game scene.

Example 31 includes the system of any one of examples 26 to 30, including or excluding optional features. In this example, the media application comprises a video player, and wherein the means for adjusting operation adjusts operation adjusts operation of the smart device in response to a user starting the video player to play a movie.

Example 32 includes the system of any one of examples 26 to 31, including or excluding optional features. In this example, the system includes means for receiving an auxiliary data file, and wherein the means for adjusting operation adjusts operation of the smart device per the auxiliary data file.

Example 33 includes the system of any one of examples 26 to 32, including or excluding optional features. In this example, the system includes means for receiving an auxiliary data file, wherein the media application comprises a video player, and wherein the means for adjusting operation adjusts operation of the smart device per the auxiliary data file.

Example 34 is a computing device to execute a media application, the computing device. The computing device includes instructions that direct the processor to a processor; and memory storing an application and instructions executable by the processor to: route, by a transfer abstraction module, data internally in a transfer stack for delivery to the smart device; deliver the data to the smart device via an Application Program Interface (API) of the computing device, wherein the API comprises a language known to the smart device; and adjust operation of the smart device via the data delivered to the smart device to customize the environment surrounding the computing device correlative with the media application for user-experience.

Example 35 includes the computing device of example 34, including or excluding optional features. In this example, the smart device comprises an Internet of Things (IoT) device.

Example 36 includes the computing device of any one of examples 34 to 35, including or excluding optional features. In this example, the API comprises an IoT API.

Example 37 includes the computing device of any one of examples 34 to 36, including or excluding optional features. In this example, the media application comprises a game or video player, wherein to adjust operation of the smart device is correlative with user interaction with the media application.

Example 38 is a method of customizing an environment of a computing device, the method. The method includes instructions that direct the processor to the computing device executing a media application; the computing device coupling to a smart device; the computing device communicating with the smart device via an Application Program Interface (API) having a language known to the smart device; the computing device routing, by a transfer abstraction module, data internally in a transfer stack for delivery to the smart device; and the computing device delivering the data to the smart device to adjust operation of the smart device correlative with the media application to customize the environment of the computing device.

Example 39 includes the method of example 38, including or excluding optional features. In this example, the smart device comprises an Internet of Things (IoT) device, and wherein the API comprises an IoT API.

Example 40 includes the method of any one of examples 38 to 39, including or excluding optional features. In this example, the media application comprises a game or video player, or a combination thereof.

Example 41 includes the method of any one of examples 38 to 40, including or excluding optional features. In this example, to adjust operation of the smart device is correlative with user interaction with the media application.

Example 42 includes the method of any one of examples 38 to 41, including or excluding optional features. In this example, to adjust operation of the smart device is correlative with auxiliary data for the media application.

Example 43 includes the method of any one of examples 38 to 42, including or excluding optional features. In this example, the smart device comprises multiple smart devices. Optionally, the multiple smart devices comprise a smart light and a smart thermostat, and wherein to adjust operation comprises to: adjust operation of the smart light to adjust room brightness; and adjust operation of the smart thermostat to adjust room temperature.

Example 44 includes the method of any one of examples 38 to 43, including or excluding optional features. In this example, the media application comprises a game application, and wherein to adjust operation of the smart device is correlative with game data comprising a game scene.

Example 45 includes the method of any one of examples 38 to 44, including or excluding optional features. In this example, the media application comprises a video player, and wherein to adjust operation of the smart device is in response to a user starting the video player to play a movie.

Example 46 includes the method of any one of examples 38 to 45, including or excluding optional features. In this example, the method includes the computing device receiving an auxiliary data file, wherein the media application comprises a video player, and wherein adjusting operation of the smart device is per the auxiliary data file.

Example 47 is a non-transitory computer readable medium comprising instructions that direct the processor of a computing device to: communicate via an Application Program Interface (API) with a smart device coupled to the computing device, the API having a language known to the smart device; route, via a transfer abstraction module, data internally in the computing device in a transfer stack for delivery to the smart device; and adjust operation of the smart device to customize a physical environment, wherein to adjust to operation is correlative with a media application running on the computing device.

Example 48 includes the non-transitory computer readable medium of example 47. In this example, the smart device comprises an Internet of Things (IoT) device, and wherein the API comprises an IoT API.

Example 49 includes the non-transitory computer readable medium of any one of the examples 47 to 48. In this example, the smart device comprises multiple smart devices comprising a smart light and a smart thermostat, and wherein to adjust operation comprises to: adjust the smart light to adjust room brightness; and adjust the smart thermostat to adjust room temperature.

Example 50 includes the non-transitory computer readable medium of any one of the examples 47 to 49. In this example, the media application comprises a game application, and wherein to adjust operation of the smart device is based on game data, or user interaction with the game application, or a combination thereof.

Example 51 includes the non-transitory computer readable medium of any one of the examples 47 to 50. In this example, the media application comprises a video player, and wherein to adjust operation of the smart device is in response to a user starting the video player to play a video, or is based on an auxiliary data file, or a combination thereof.

Example 52 is a non-transitory computer readable medium comprising instructions that direct the processor of a computing device to: interact via an Application Program Interface (API) with a smart device coupled to the computing device, the API having a language known to the smart device; route, via a transfer abstraction module, data internally in the computing device in a transfer stack for delivery to the smart device; deliver the data from the computing device to the smart device; and adjust operation of the smart device via the data delivered to the smart device to customize an environment of the computing device for user experience.

Example 53 includes the non-transitory computer readable medium of example 52. In this example, to adjust to operation is correlative with a media application executing on the computing device.

It is to be understood that specifics in the aforementioned examples may be used anywhere in one or more embodiments. For instance, all optional features of the computing device described above may also be implemented with respect to either of the methods described herein or a computer-readable medium. Furthermore, although flow diagrams and/or state diagrams may have been used herein to describe embodiments, the present techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. A computing device comprising:
a processor; and
memory storing instructions executable by the processor to:
adjust operation of a smart device disposed in an environment of a user of the computing device to customize the environment of the user of the computing device for user experience to enhance an experience of the user of the computing device while the user consumes content relating to an application executing on the computing device, the adjusting based, at least in part, on the content being consumed by the user being correlative with the smart device operation adjustment;
communicate with the smart device via an Application Program Interface (API) having a language known to the smart device; and
internally route, via a transport abstraction module, data in a transfer stack for delivery of the data to the smart device.

2. The computing device of claim 1, comprising a network adapter to couple the computing device with the smart device, and wherein the smart device comprises multiple smart devices.

3. The computing device of claim 1, wherein the smart device comprises an Internet of Things (IoT) device, and wherein the API comprises an IoT API.

4. The computing device of claim 1, wherein the smart device comprises multiple smart devices comprising a smart light and a smart thermostat, and wherein to adjust operation comprises to:
adjust the smart light to adjust room brightness; and
adjust the smart thermostat to adjust room temperature.

5. The computing device of claim 1, wherein the application comprises a game application, and wherein to adjust operation of the smart device is based on user interaction with the game application.

6. The computing device of claim 1, wherein the application comprises a game application, and wherein to adjust operation of the smart device is based on game data comprising a game scene.

7. The computing device of claim 1, wherein the application comprises a video player, and wherein to adjust operation of the smart device is in response to a user starting the video player to play a video.

8. The computing device of claim 1, wherein the application comprises a video player, and wherein to adjust operation of the smart device is based on an auxiliary data file.

9. The computing device of claim 1, wherein the application comprises a media application, and wherein the API when executed by the processor facilitates communication of the computing device with devices locally and in a cloud network, the devices comprising the smart device.

10. The computing device of claim 1, wherein the transport abstraction module hides a mechanism facilitating delivery of the data from the computing device to the smart device.

11. The computing device of claim 1, wherein the transfer stack is directed to Bluetooth, a Wi-Fi access point connection, Wi-Fi Direct, Near Field Communication (NFC), or Ethernet wired connection, or any combination thereof.

12. A non-transitory, computer-readable medium comprising instructions executable by a processor of a computing device to:
adjust operation of a smart device disposed in an environment of a user of the computing device to customize the environment of the user of the computing device to enhance an experience of the user of the computing device while the user consumes content relating to an application executing on the computing device, the adjusting based, at least in part, on the content being consumed by the user being correlative with the smart device operation adjustment;
communicate with the smart device via an Application Program Interface (API) having a language known to the smart device;
internally route, via a transfer abstraction module, data in a transfer stack for delivery to the smart device.

13. The non-transitory, computer-readable medium of claim 12, wherein the smart device comprises an Internet of Things (IoT) device, and wherein the API comprises an IoT API.

14. The non-transitory, computer-readable medium of claim 12, wherein the smart device comprises multiple smart devices comprising a smart light and a smart thermostat, and wherein to adjust operation comprises to:
adjust the smart light to adjust room brightness; and
adjust the smart thermostat to adjust room temperature.

15. The non-transitory, computer-readable medium of claim 12, wherein the application comprises a game application, and wherein to adjust operation of the smart device is based on game data, or user interaction with the game application, or a combination thereof.

16. The non-transitory, computer-readable medium of claim 12, wherein the application comprises a video player, and wherein to adjust operation of the smart device is in response to a user starting the video player to play a video, or is based on an auxiliary data file, or a combination thereof.

17. A method of customizing an environment of a computing device, the method comprising the computing device:
executing an application;
communicating with a smart device disposed in an environment of a user of the computing device via an Application Program Interface (API) having a language known to the smart device;
routing, via a transfer abstraction module, data internally in a transfer stack for delivery to the smart device; and
adjusting operation of the smart device to customize the environment of the user of the computing device to enhance an experience of the user of the computing device while the user consumes content relating to the application executing on the computing device, the adjusting based, at least in part, on the content being consumed by the user being correlative with the adjusting of the operation of the smart device.

18. The method of claim 17, wherein the smart device comprises an Internet of Things (IoT) device, and wherein the API comprises an IoT API.

19. The method of claim 17, wherein the smart device comprises multiple smart devices comprising a smart light and a smart thermostat, and wherein adjusting operation comprises:
adjusting operation of the smart light to adjust room brightness; and
adjusting operation of the smart thermostat to adjust room temperature.

20. The method of claim 17, wherein the application comprises a game application, and wherein adjusting operation of the smart device is correlative with user interaction with the game application.

21. The method of claim 17, wherein the application comprises a game application, and wherein adjusting operation of the smart device is correlative with game data comprising a game scene.

22. The method of claim 17, wherein the application comprises a video player, and wherein adjusting operation of the smart device is in response to a user starting the video player to play a movie.

23. The method of claim 17, comprising the computing device receiving an auxiliary data file, wherein the application comprises a video player, and wherein adjusting operation of the smart device is per the auxiliary data file.

24. A system for customizing an environment, the system comprising:
a smart device disposed in an environment of a user;
a computing device comprising:
a processor; and
memory storing an application and instructions executable by the processor to:
route, via a transport abstraction module, data internally in a transfer stack for delivery to the smart device;
deliver the data to the smart device via an Application Program Interface (API) having a language known to the smart device; and
adjust operation of the smart device via the data delivered to the smart device to customize the environment of the user to enhance an experience of the user while the user consumes content relating to an application executing on the computing device, the adjusting based, at least in part, on the content being consumed by the user being correlative with the smart device operation adjustment.

25. The system of claim 24, wherein:
the computing device to execute a media application;
the computing device to establish a connection with the smart device;
the smart device comprises an Internet of Things (IoT) device;
the API comprises an IoT API; and
the media application comprises a game or video player, wherein to adjust operation of the smart device is correlative with user interaction with the media application.

26. The computing device of claim 1, wherein the application provides a video stream for user viewing or a game for user playing.

27. The computing device of claim 1, the customizing of the environment comprising adjusting one or more of light, vibration, temperature, or sound in the environment.

28. The non-transitory computer-readable medium of claim 12, wherein the application provides a video stream for user viewing or a game for user playing.

29. The non-transitory computer-readable medium of claim 12, the customizing of the environment comprising adjusting one or more of light, vibration, temperature, or sound in the environment.

30. The method of claim 17, wherein the application provides a video stream for user viewing or a game for user playing.

31. The method of claim 17, the customizing of the environment comprising adjusting one or more of light, vibration, temperature, or sound in the environment.

32. The system of claim 24, wherein the application provides a video stream for user viewing or a game for user playing.

33. The system of claim 24, the customizing of the environment comprising adjusting one or more of light, vibration, temperature, or sound in the environment.

* * * * *